United States Patent
O'Brien (10) Patent No.: US 11,899,033 B2
(45) Date of Patent: Feb. 13, 2024

(54) ACCESS PORT FOR A THERMOGRAVIMETRIC ANALYZER FURNACE

(71) Applicant: Leco Corporation, St. Joseph, MI (US)

(72) Inventor: Larry S. O'Brien, Stevensville, MI (US)

(73) Assignee: Leco Corporation, St. Joseph, MI (US)

(*) Notice: Subject to any disclaimer, the term of this patent is extended or adjusted under 35 U.S.C. 154(b) by 801 days.

(21) Appl. No.: 15/827,367

(22) Filed: Nov. 30, 2017

(65) Prior Publication Data

US 2018/0156705 A1 Jun. 7, 2018

Related U.S. Application Data

(60) Provisional application No. 62/428,676, filed on Dec. 1, 2016.

(51) Int. Cl.
| | |
|---|---|
| *G01N 5/02* | (2006.01) |
| *G05D 27/02* | (2006.01) |
| *F27D 1/18* | (2006.01) |
| *G01N 25/02* | (2006.01) |
| *F27B 17/02* | (2006.01) |
| *G01N 25/56* | (2006.01) |

(52) U.S. Cl.
CPC ............. *G01N 5/025* (2013.01); *F27B 17/02* (2013.01); *F27D 1/1858* (2013.01); *G01N 25/02* (2013.01); *G05D 27/02* (2013.01); *G01N 25/56* (2013.01)

(58) Field of Classification Search
CPC ........ G01N 5/025; G01N 5/045; G01N 25/02; G01N 25/20; G01N 31/12
See application file for complete search history.

(56) References Cited

U.S. PATENT DOCUMENTS

| | | | |
|---|---|---|---|
| 3,491,992 A | * | 1/1970 | Reichelt ................ C23C 14/243 432/264 |
| 4,522,788 A | | 6/1985 | Sitek et al. |
| 4,537,572 A | | 8/1985 | Hill et al. |
| 4,579,313 A | | 4/1986 | Adani et al. |
| 5,215,377 A | | 6/1993 | Sugano |
| 5,306,087 A | | 4/1994 | Nakamura et al. |
| 5,398,556 A | | 3/1995 | Lang |
| 6,015,532 A | * | 1/2000 | Clements ............... G01N 35/02 422/510 |
| 6,092,924 A | | 7/2000 | Scalese et al. |
| 7,172,729 B2 | | 2/2007 | Las Navas Garcia |
| 7,404,670 B2 | | 7/2008 | Willis |
| 7,566,167 B2 | | 7/2009 | Danley et al. |

(Continued)

*Primary Examiner* — Jill A Warden
*Assistant Examiner* — Dwayne K Handy
(74) *Attorney, Agent, or Firm* — Price Heneveld LLP (57) ABSTRACT

The analyzer of the present invention is specifically adapted to provide moisture determinations for foods and other agricultural material. It allows the operator to introduce a precise weight of sample into a crucible in a closed furnace in a controlled environment through an access port in the furnace cover. The access port in the cover can be tapered to allow easy access to an underlying aligned crucible and allow an operator to add and remove sample material from the crucible until a precise desired sample weight is reached as measured by a balance within the furnace. The access port is enclosed by an insulated cover after the samples are sequentially placed in the crucibles.

22 Claims, 5 Drawing Sheets

(56) References Cited

U.S. PATENT DOCUMENTS

| | | | |
|---|---|---|---|
| 9,377,419 B2 | 6/2016 | Las Navas Garcia | |
| 2004/0173142 A1* | 9/2004 | Willis | F27B 14/20 |
| | | | 117/200 |
| 2004/0175295 A1* | 9/2004 | Garcia | G01N 5/045 |
| | | | 422/78 |
| 2016/0011128 A1 | 1/2016 | Las Navas Garcia | |

* cited by examiner

ACCESS PORT FOR A THERMOGRAVIMETRIC ANALYZER FURNACE

This application claims priority under 35 U.S.C. § 119(e) and the benefit of U.S. Provisional Application No. 62/428,676 entitled ACCESS PORT FOR A THERMOGRAVIMETRIC ANALYZER FURNACE, filed on Dec. 1, 2016, by Larry S. O'Brien, the entire disclosure of which is incorporated herein by reference.

BACKGROUND OF THE INVENTION

The present invention relates to a thermogravimetric furnace having an access port in a cover for introducing sample material into crucibles held in a carousel within the furnace. With the cover closed, the samples remain in a controlled environment.

Many laboratory analyzers employ combustion or other types of furnaces which heat and/or combust a sample for the determination of chemical elements in the sample. One type of analyzer is a thermogravametric analyzer which employs a furnace with a cover which is opened to allow an operator to place samples in crucibles held in a carousel. Once the samples are loaded, the cover is closed, and the temperature and atmosphere of the furnace is then carefully controlled. The furnace includes a balance for weighing both empty crucibles and sample-containing crucibles before heating, during heating, and after the heating cycle to determine weight loss of the sample. The thermogravimetric analyses of materials provide important information as to moisture content, volatiles, ash, or fixed carbon, as well as weight loss or gain on ignition. Materials, such as coal, coke, graphite, flour, dough, plant tissue, feeds, fertilizer, food stuffs, chemicals, rubbers, plastics, ceramics, minerals, soils, sediments, and paper, are all capable of thermogravametric analysis utilizing ASTM standards, which detail the requirements for determining the moisture, volatiles, fixed carbon, ash content, and ignition content of these various materials.

The determinations are made by first weighing samples and crucibles, and then subjecting the samples to a well-controlled time/temperature profile in a controlled atmosphere once the furnace cover is closed in prior furnace designs. The samples are weighed successively during the control period to determine weight loss at different temperatures and/or at the end of the cycle. Well known mathematical formulas are then employed to calculate the moisture, volatiles, fixed carbon, ash, and ignition content of the material. It is of primary importance that the temperature profile is accurately known and precisely controlled, particularly where sample material can loose discrete percentages of its weight at distinct temperatures.

Prior art analyzers performing sample analyses and analyzers performing multiple sample thermogravametric analyses typically use a furnace having a circular carousel with a plurality of openings near the outer rim for holding multiple sample-containing crucibles. The furnace includes a pivoted cover to allow crucibles to be positioned on the carousel and loaded with samples prior to closing the cover and beginning an analysis cycle. A balance sequentially weighs each crucible before, during, and after heating of a sample, as described in U.S. Pat. Nos. 4,522,788 and 7,404,670, the disclosures of which are incorporated herein by reference. Such systems expose the sample to the ambient environmental atmosphere while the cover is open and samples are being loaded into awaiting crucibles. This can be somewhat time-consuming and adversely affect the analytical results as, for example, the moisture content of a sample can change when samples are loaded into crucibles in an open environment.

SUMMARY OF THE INVENTION

The analyzer furnace of the present invention is specifically adapted to provide moisture determinations for foods, feeds, and other agricultural products. It allows the operator to introduce a precise weight of a sample into a crucible in a closed furnace and into a controlled environment through an access port in the cover. The access port in the cover can be tapered or otherwise configured to allow easy access to an underlying aligned crucible and allow an operator to add and remove sample material from a crucible until a precise desired sample weight is reached as measured by a balance within the furnace. The access port is enclosed by an insulated cover after the samples are sequentially placed in separate angularly spaced-apart crucibles.

With this system, any number of samples, depending on the particular carousel and crucibles selected, can be individually analyzed. In one embodiment, larger crucibles are employed and, for example, up to 10 samples can be analyzed. In another embodiment, smaller crucibles are used and the carousel can hold a greater number of crucibles, allowing, for example, up to 16 samples to be sequentially analyzed. By providing a tapered or otherwise configured access port, the furnace cover can be closed with empty crucibles in position within the rotatable carousel of the furnace, and the operator can select and admit the samples individually through the access port into a selected crucible. The access port allows the furnace to be substantially enclosed while adding samples to awaiting crucibles which are in a controlled environment. It also allows precise introduction of sample material which can be added or removed to reach a desired sample weight for analysis.

In one embodiment, a thermogravimetric analyzer furnace is provided with a base including a rotatable disk-shaped carousel having a plurality of apertures for receiving crucibles. A cover is coupled to the base for selectively allowing access to the carousel and a heating element in at least one of the base and cover is provided for heating samples in the crucibles. The cover includes an access port aligned with at least one of the crucibles to allow an operator to position sample material in the crucible through the access port.

Although particularly well adapted for moisture content analysis, the analyzer with an access port in the cover can be employed with any thermogravimetric analyzer in applications other than moisture content. These and other features, objects and advantages of the present invention will become apparent upon reading the following description thereof together with reference to the accompanying drawings.

DETAILED DESCRIPTION OF THE PREFERRED EMBODIMENT

Figure 1:
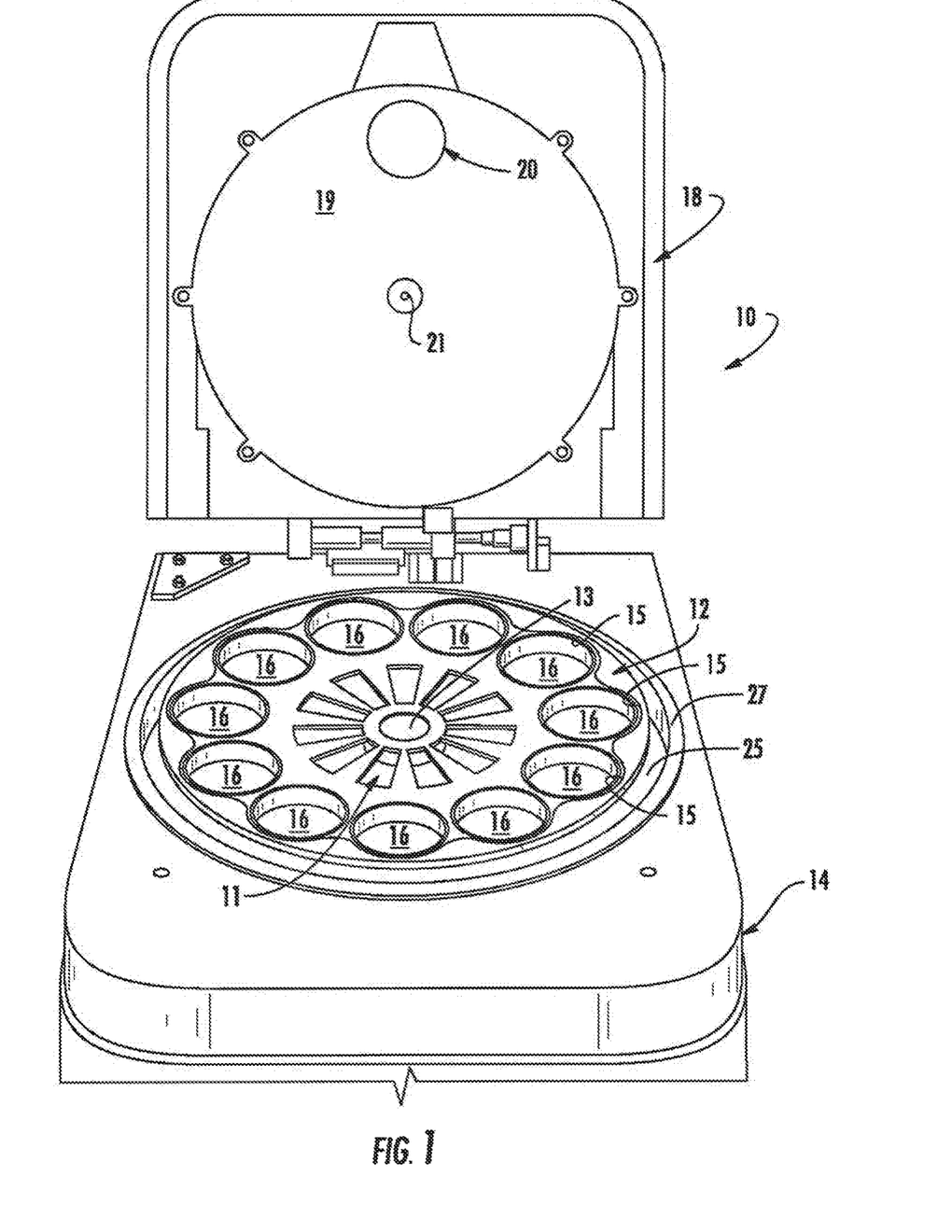
FIG. 1 is a is a front perspective view of a furnace embodying the present invention, shown in an open position for introducing empty crucibles.
Figure 2:
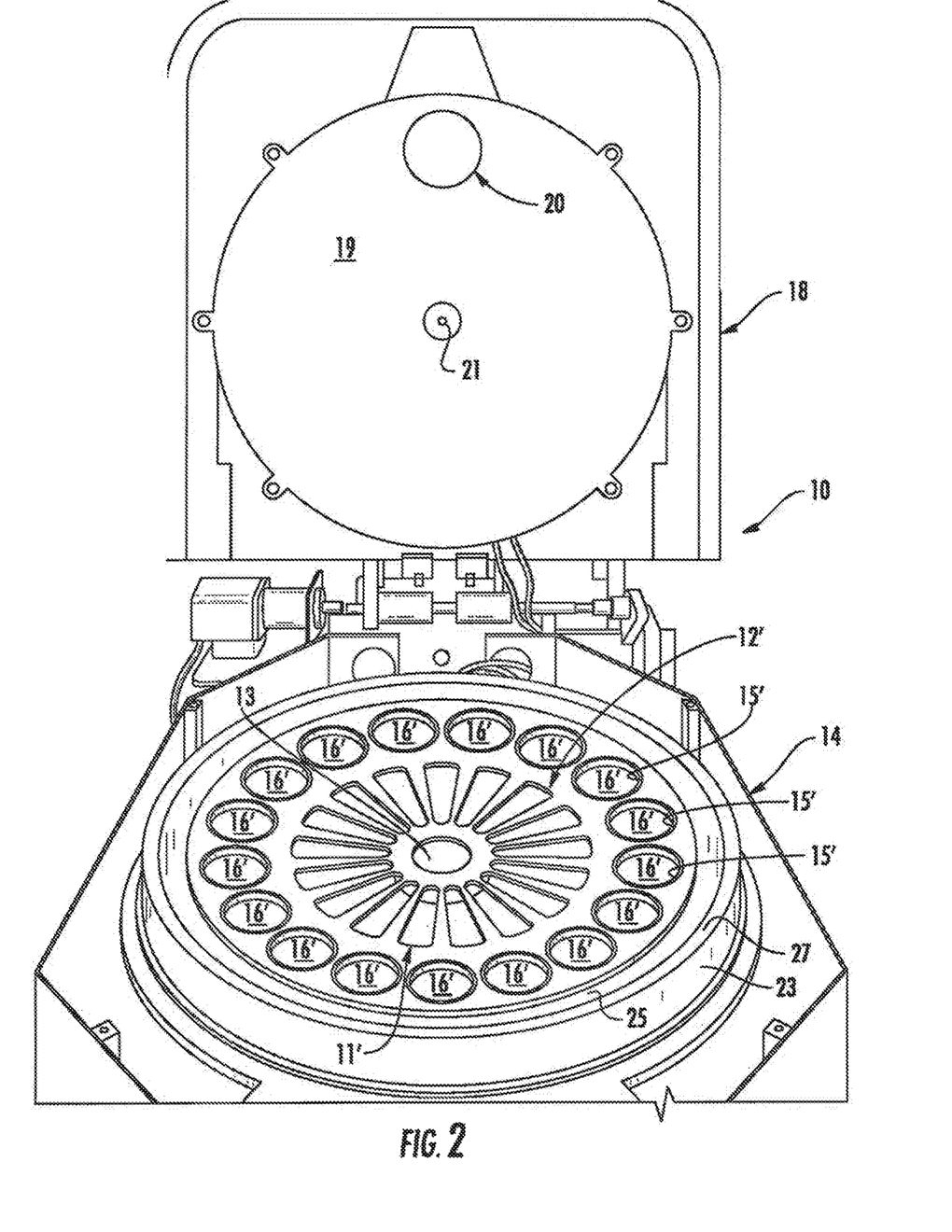
FIG. 2 is a is a front perspective view of the furnace shown in FIG. 1, shown with the base cover removed.

Referring initially to FIGS. 1 and 2, there is shown a furnace 10 for thermogravimetric analysis and embodying the present invention. The furnace 10 of FIG. 1 includes a carousel 12 which accommodates larger crucibles while the furnace 10 of FIG. 2 has a carousel 12' which accommodates a larger number of smaller crucibles. The primary difference in the furnaces is the configuration of the rotatable carousels 12 and 12' to accommodate the different size and number of crucibles Each of the furnaces 10 includes a rotatable carousel coupled to a rotatable hub 13 in the bases 14 of the furnaces. The carousels have a plurality of apertures 15, 15' for receiving crucibles 16, 16' therein. The furnaces each include a pivoted cover 18 which can be opened, as seen in FIGS. 1 and 2, to allow empty crucibles to be placed in the apertures of the carousels. In FIG. 1, the furnace 10 has eleven crucible-receiving apertures 15, with one crucible at an index location being left empty as a control. In FIG. 2, the carousel 12' includes sixteen sample-holding crucible apertures 15', again with one available for holding an empty crucible at the index location.

Figure 3:
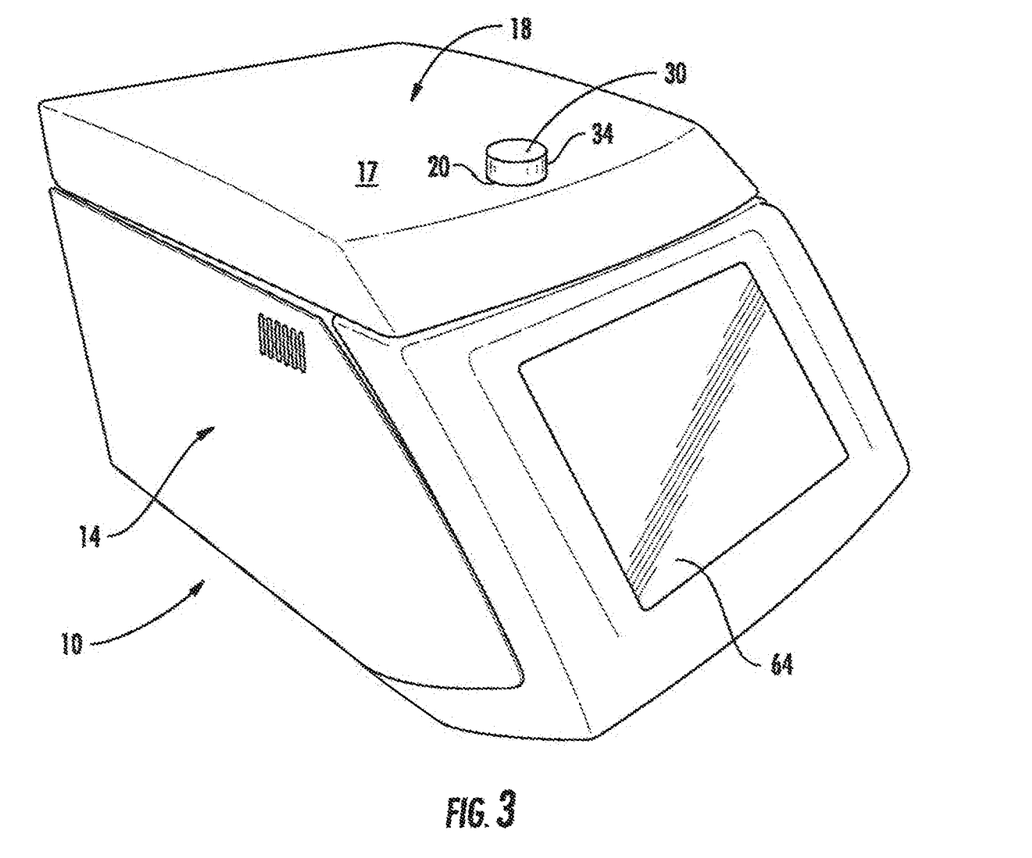
FIG. 3 is a perspective view of the furnaces shown in FIGS. 1 and 2, shown with the cover closed and the access port covered with a plug.
Figure 4:
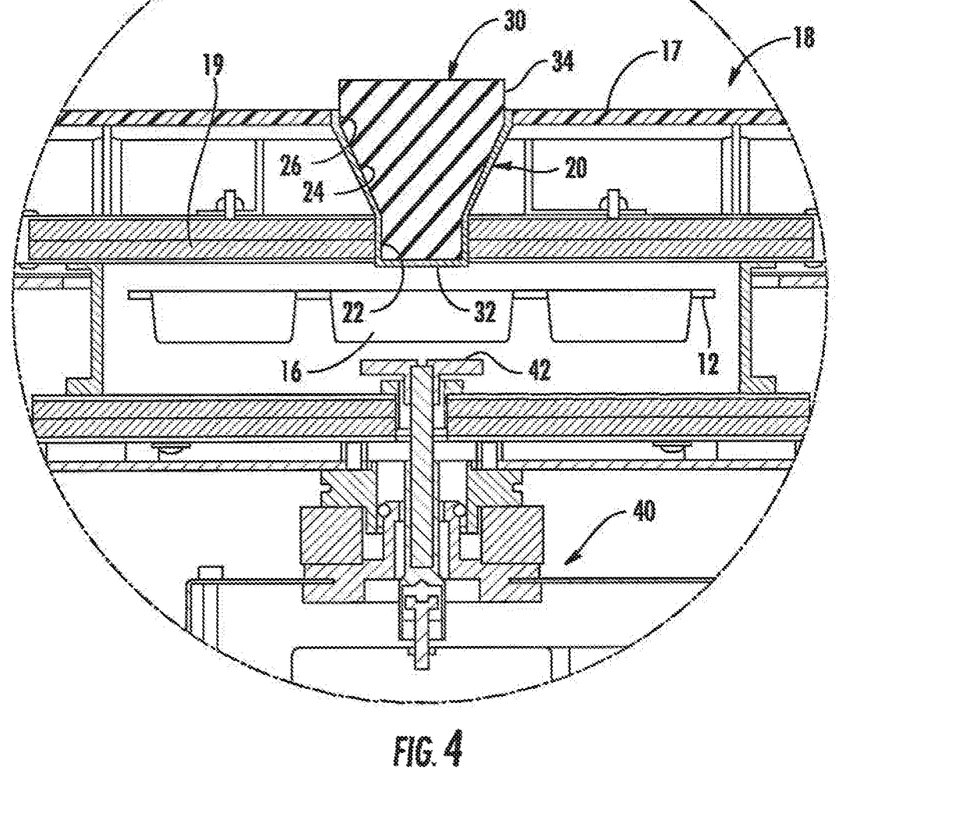
FIG. 4 is a fragmentary, enlarged, cross-sectional view of the furnace cover access port and plug for the access port which are incorporated into the furnace shown in FIGS. 1-3.

The control system for the furnaces of FIGS. 1 and 2 can be of the type described in U.S. Pat. No. 7,404,670, the disclosure of which is incorporated herein by reference. The furnaces of FIGS. 1 and 2 include heaters in the bases 14 and covers 18 for uniformly heating the sample-containing crucibles 16, 16'. The covers 18, when closed as seen in FIGS. 3 and 4, enclose the carousels 12, 12' and sample-holding crucibles 16, 16' for running an analysis. Furnaces 10 are unique in that the crucibles 16, 16' are first loaded empty into the carousels 12, 12', the cover closed, and sample material is sequentially added to the crucibles through an access port 20 in the covers as shown in FIGS. 1-4.

Carousels 12, 12' each include fan-shaped apertures 11, 11' extending outwardly from the central rotating hub 13 to which the carousels 12, 12' are coupled. Nitrogen is introduced under the carousel through nozzles on opposite sides of the carousel and flows through the apertures 11, 11' to direct nitrogen into the furnace chamber when the covers 18 are closed. The nitrogen, thus, floods the furnace chamber with the inert gas during the stepped heating process of analysis. The nitrogen exits through an aperture 21 in the covers and subsequently is vented to the atmosphere. The furnaces 10 include a circular wall 23 (FIG. 2) with a top rim 27 which seats against surface 19 of cover 18 when closed. A gap 25 (FIG. 2) exists between furnace wall 23 and the outer periphery of carousels 12, 12' to allow free rotation of the carrousels. The side wall 23 has a reduced thickness of about 0.050" below rim 27 to reduce thermal mass.

The crucibles 16, 16' can, for moisture analysis of food stuffs and other agricultural materials, be made of aluminum foil. The empty crucibles are preloaded into an open furnace 10, the cover 18 closed, and the number of samples to be analyzed are then sequentially positioned in the crucibles through access port 20 as described below.

The crucibles 16, 16' are made of aluminum foil having a thickness of about 0.035 inches.

The larger crucible 16 has a tapered shallow flower pot type shape with an open mouth of about 2.4 inches and a floor of about 1.8 inches and a height of about 0.81 inches. The larger crucibles 16, shown in FIG. 1, are employed with larger samples which improve the precision of the analysis by providing more signal information over an analytical cycle. Smaller samples are employed in the crucibles 16' (FIG. 2), where a greater number of smaller samples are desired to be quickly analyzed. Again, the foil crucibles have a thickness of about 0.035 inches. The open mouth of crucible 16' is about 1.5 inches. The overall shape again is tapered and somewhat flower pot shaped with a depth of about 0.95 inches with a circular floor having a diameter of about 0.88 inches. The smaller crucibles 16' shown in FIG. 2 allow the analysis of numerous smaller samples relatively quickly while still preserving the accuracy of the analysis. Typically samples will run from 1 gram to up to 5 grams depending on the crucible size being employed.

As shown in FIGS. 1-3, the access port 20 is located forwardly on the cover 18 and is centered in alignment over, as best seen in FIG. 4, a crucible 16, 16' held within the carousels 12, 12' at the index position. As seen in FIG. 4, access port 20, in one embodiment, is a fixed generally funnel-shaped member made of stainless steel or other suitable material and has a cylindrical lower end 22 which extends through the horizontal inner wall 19 of cover 18. The diameter of cylindrical end 22 is selected to be smaller than the open mouth of crucibles 16, 16', such that sample material introduced through access port 20 does not spill from the crucibles. The access port includes conical side walls 24 extending upwardly from the cylindrical lower end 22 and terminating in a second, wider cylindrical end defining a top opening 26 which extends in substantially coplanar relationship to the upper surface 17 of cover 18. The conical side walls 24 typically will have a size of from about 1¼" to 2" at the top opening 26 and a ¾" to 1¼" opening in cylindrical lower end 22 at the bottom. The funnel-shaped access port can range in height from 1½" to 3" and preferably about 2". The shape of the access port can be varied from a straight cylinder to a continuous conical shape, although the funnel shape depicted in FIG. 4 is preferable.

The top opening 26 of the access port 20 is selectively closed by a tapered insulated plug 30 during an analysis. To allow admission of samples into crucibles 16, 16', an operator manually removes the insulated plug and adds, using a suitable scoop, usually granular sample material to a crucible 16, 16' within the furnace. During this process, the balance 40 (FIG. 4) in the furnace 10, which has a crucible-support platform 42, weighs a sample-holding crucible as the carousel stepwise rotates and lowers to place a crucible on the platform 42. A carousel 12, 12' is then raised and rotated to the next crucible aligned position where the sequence is repeated. It is noted that the balance has previously tared out all of the empty crucibles. The control circuit 50 (FIG. 5) controls lifting assembly 66 and rotation motor 68 (FIG. 5) to sequentially raise, lower, and rotate carousels 12, 12' to sequentially present crucibles in alignment under access port 20. This loading and weighing process is repeated until the furnace is full or the operator has added a desired lesser number of samples.

After the samples are loaded, the access port 20 is selectively covered by an insulated plug 30. Plug 30 is shaped to conform to the interior shape of port 20 and can be a lamination of several materials, including Pyropel® MD-50, at the lower surface 32 facing the aligned crucibles 16, 16'. Plug 30 may include additional layers of metal and plastic sufficient to define an upper gripping member 34 (FIGS. 3 and 4) to allow an operator to easily remove and install the plug into the access port through the top opening 26 of access port 20. The lower surface 32 of plug 30 is coplanar with the lower surface of wall 19 of cover 18 to thermally seal the access port 20 during an analysis. The thermogravimetric analyzer and furnace 10 are controlled by the control circuit 50 of FIG. 5, now briefly described.

Figure 5:
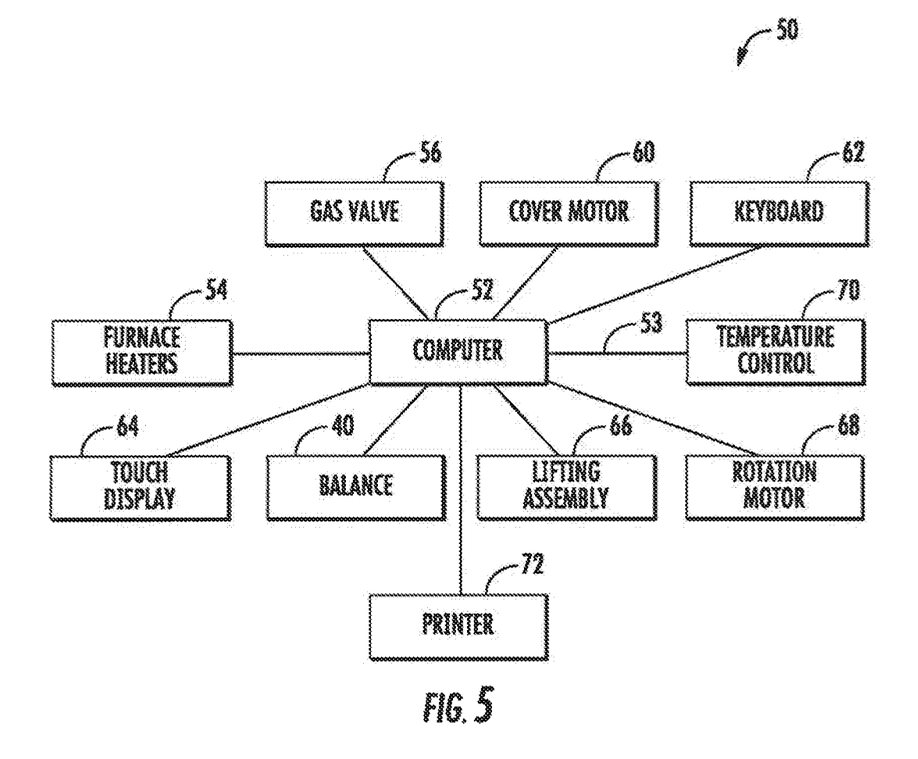
FIG. 5 is a block electrical circuit diagram of the control circuit for the analyzer employing the furnace of this invention.

Control circuit 50 includes a computer 52 coupled by suitable interface circuits to heaters 54 located in a base 14, 14' under a carousel 12, 12' and in a cover 18, 18'. The samples are heated to a temperature, in steps under the control of computer 52, of about 50° C. to about 150° C. over a period of time. The computer 52 is also coupled to a gas valve 56 for supplying nitrogen from a source (not shown) coupled to valve 56 for controlling the atmosphere of the furnace 10. Computer 52 is also coupled to a cover actuating motor 60, an input keyboard 62, a touch screen display 64, an electronic balance 40, the carousel lifting assembly 66, and the carousel rotation motor 68. A temperature control circuit 70 provides signal input information from thermocouples positioned in furnace 10 through pre-amplifiers and A-to-D converters to inputs of a microprocessor, which is coupled by a data bus 53 to computer 52. Computer 52 responds to the temperature information provided by the microprocessor to provide training and tuning and the resultant modeling of the crucible temperature response within the furnace as described in connection with the program flow diagrams, such as disclosed in U.S. Pat. No. 7,404,670. The computer 52, thus, correlates temperatures during a cycle of operation of the furnace through increasing temperature steps to develop and store temperature control signals for controlling the application of power to the heating elements. Computer 52 is also coupled to a printer 72 for providing the operator with a printout of the analytical results which may, for example, include a graph and specific data for each sample being analyzed.

With the improved furnace of this invention featuring an access port in the cover, an operator has quick access to any crucible to allow entry of precise sample amounts to a crucible held in an enclosed environment within the furnace 10. This improves the accuracy of an analysis and allows an operator a great deal of flexibility in running samples for analysis.

It will become apparent to those skilled in the art that various modifications to the preferred embodiments of the invention as described herein can be made without departing from the spirit or scope of the invention as defined by the appended claims.

The invention claimed is:

1. A furnace for a thermogravimetric analyzer, said furnace comprising:
   a base including a rotatable carousel having a plurality of apertures for receiving crucibles;
   a cover movably coupled to said base for movement between open and closed positions to selectively allow access to said carousel;
   a heating element in at least one of said base and cover for heating samples positioned in crucibles; and
   said cover including an access port aligned with at least one of said crucible-receiving apertures to allow an operator to position sample material in at least one crucible through said access port when said cover is in a closed position, wherein the access port has an opening that is smaller than the apertures in the carousel that receive the crucibles.

2. The furnace as defined in claim 1 wherein said access port is inwardly tapered from said cover toward said carousel.

3. The furnace as defined in claim 1 wherein said access port is funnel-shaped.

4. The furnace as defined in claim 1 and further including an insulated plug which is positioned in said access port during an analysis.

5. The furnace as defined in claim 4 wherein said plug has a surface facing said carousel which is made of a material resistant to high temperatures.

6. The furnace as defined in claim 1 and further including a control circuit for sequentially moving said carousel to sequentially align successive crucible-receiving apertures with said access port to allow an operator to add samples to be analyzed into multiple crucibles posited in said crucible-receiving apertures of said carousel when said cover is closed.

7. The furnace as defined in claim 1 wherein said access port is dimensioned to allow an operator to add and remove sample material to a crucible positioned in a crucible-receiving aperture with said cover in a closed position.

8. The furnace as defined in claim 7 wherein said access port has an upper opening of from about 1¼" to about 2".

9. The furnace as defined in claim 8 wherein said access port has a lower opening facing said carousel of from about ¾" to about 1¼".

10. The furnace as defined in claim 9 wherein said access port has a height from about 1½" to about 3".

11. The furnace as defined in claim 10 wherein said access port has a height of about 2".

12. A furnace comprising:
    a base including a rotatable disk-shaped carousel having a plurality of apertures for receiving and holding crucibles;
    a cover coupled to said base and movable between open and closed positions for selectively allowing access to said carousel;
    a heating element in at least one of said base and cover for heating samples to be analyzed placed in one or more crucibles positioned in said crucible-holding apertures of said carousel; and
    wherein said cover includes an access port dimensioned to allow an operator to add sample material to a crucible positioned in a crucible-holding aperture of said carousel with said cover in a closed position, said access port selectively aligned with one or more crucible-receiving apertures in said carousel to allow an operator to position sample material in a crucible through said access port, wherein the access port has an opening that is smaller than the apertures in the carousel that receive the crucibles.

13. The furnace as defined in claim 12 and further including an insulated plug which is positioned in said access port when said heating element heats samples in said furnace.

14. The furnace as defined in claim 13 and further including a control circuit for sequentially moving said carousel to sequentially align successive crucible-holding apertures with said access port to allow an operator to add samples to be analyzed into multiple crucibles that are positioned in said carousel.

15. The furnace as defined in claim 14 wherein said access port is inwardly tapered from said cover toward said carousel.

16. The furnace as defined in claim 15 wherein said plug has a shape conforming to said access port and has a surface facing said carousel which is made of a high temperature resistant material.

17. The furnace as defined in claim 16 in combination with a plurality of crucibles made of aluminum foil and positioned in said crucible-receiving apertures.

18. A thermogravimetric analyzer comprising:
a furnace having a base and a cover pivotally coupled to said base for movement between open and closed positions, wherein said base includes a carousel with a plurality of circular crucible-receiving apertures having one of two different diameters for receiving a plurality of crucibles positioned in said apertures of said carousel;
an access port formed in said cover and selectively aligned with one of said crucible-receiving apertures to allow a sample to be positioned from outside of the furnace into said one of said crucibles through said cover when said cover is in a closed position, wherein the access port has an opening smaller than an open mouth of the crucibles;
a heating element in said furnace;
a temperature control circuit for controlling the application of power to said heating element;
at least one temperature sensor positioned in said furnace for detecting the furnace temperature;
an electronic balance in said furnace for weighing said one of said crucibles in the carousel; and
a computer coupled to said temperature sensor and to said temperature control circuit to correlate temperatures during a cycle of operation of said furnace through increasing temperature steps to develop and store temperature control signals for controlling the application of power to said heating element, wherein the computer is coupled to said electronic balance to weigh said one of said crucibles throughout the cycle of operation to analyze the sample.

19. The thermogravimetric analyzer as defined in claim 18 wherein said access port is inwardly tapered from said cover toward said carousel to allow sample material to be added and removed from a crucible.

20. The thermogravimetric analyzer as defined in claim 18 wherein said plug has a shape conforming to said access port and has a surface facing said carousel which is made of a high temperature resistant material.

21. The furnace as defined in claim 12 and further comprising a plurality of crucibles positioned in said apertures of said carousel, wherein the access port has an opening smaller than an open mouth of the crucibles.

22. The furnace as defined in claim 1 and further comprising a plurality of crucibles positioned in said apertures of said carousel, wherein the access port has an opening smaller than an open mouth of the crucibles.

* * * * *